(12) United States Patent
Klein et al.

(10) Patent No.: US 7,324,994 B2
(45) Date of Patent: Jan. 29, 2008

(54) UNIQUELY IDENTIFYING AN OBJECT BEFORE IT IS STORED IN A DATABASE

(75) Inventors: Udo Klein, Maximiliansau (DE); Christian Behrens, Leimen (DE); Steffen Rotsch, Rauenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 477 days.

(21) Appl. No.: 10/713,875

(22) Filed: Nov. 14, 2003

(65) Prior Publication Data

US 2005/0108226 A1  May 19, 2005

(51) Int. Cl.
*G06F 17/30* (2006.01)
(52) U.S. Cl. .................... 707/8; 707/3; 707/104.1; 707/101
(58) Field of Classification Search ............... None
See application file for complete search history.

(56) References Cited

U.S. PATENT DOCUMENTS 4,914,569 A * 4/1990 Levine et al. ............... 707/8
5,515,531 A * 5/1996 Fujiwara et al. ............ 707/3

* cited by examiner

*Primary Examiner*—Charles Rones
*Assistant Examiner*—Belix M Ortiz
(74) *Attorney, Agent, or Firm*—Fish & Richardson P.C.

(57) ABSTRACT

Systems and techniques to identify records corresponding to a database system before they are stored in the database. In general, in one implementation, the technique includes: generating a mapping that may be usable to identify a record in a database by reference to a database key. The database key may have a corresponding record in the database and the database key can be a unique value based on information independent of both the content and organization of a record. The technique can include generating a second mapping usable to identify records in the database by reference to a second type of database key. The second type of database key may correspond to a record in the database and the second type of database key can be a unique value.

11 Claims, 3 Drawing Sheets

UNIQUELY IDENTIFYING AN OBJECT BEFORE IT IS STORED IN A DATABASE

BACKGROUND

The following description relates to a database system. More particularly, the present application describes a database system and a method in a database system for uniquely identifying a record.

Database systems are commonly employed in computing systems to store and organize information. A database system may include a database and a program for accessing the database. A database is a self-describing collection of records. Each record may be a representation of some physical or conceptual object that contains information. The information contained in a record may be organized by multiple attributes. For example, if a database were used to keep track of employees in a corporation, each record might include attributes such as a first name, last name, home address, and telephone number. Records in a database are typically accessed through the use of a key included in the database system.

SUMMARY

The database system described here, and corresponding techniques for use, may include various combinations of the following features.

The present disclosure includes systems and techniques relating to identifying a record corresponding to a database system. According to an aspect, a database system may include a database, a program that uses a database key to identify a record, and a database key association layer. The database may be stored on a storage device. The database key association layer may generate the database key and associate the database key with a record key in response to a record access by the program. The record key may include a key, which can be used to identify the record in the database.

Implementations may include one or more of the following features. The record may include the associated database key when stored in memory at runtime; however, the database key may be removed before a record is stored in the database. The database key can be based upon a value independent of both the content and organization of a record in a database. The database key association layer can be operable to generate a second type of database key which may be used to identify the record in the database. The second database key can be based upon the record content and organization of the record in a database. Record access may include generation of the record.

In another aspect, a method may be used to identify records in a database system. The method may include presenting a user interface to access records in a database; associating a record key with a database key in response to a record access; modifying the record key based on input received via the user interface; associating the modified record key with the database key; and, providing access to the record through the user interface. In that case, the record key may include a key used to identify the record, and the database key may include a key used to track the record. Also, when access can be provided, a record in the database may be identified by using the database key associated with the modified record key.

Implementations may include one or more of the following features. The database key may be a unique value based on information independent of both the content and organization of a record in a database. The method may further include removing the database key from the record before storing the record in the database. In that case, the record may include the associated database key when stored in memory at runtime. Record access may include generating a record, and/or saving the record corresponding to the modified record key to the database. The record key may include an object identifier portion and an object type portion. In that case, modifying the record key may include copying the record in the database. The method may further include associating a second type of record key with the record in the database and providing access to the record through the user interface using the second type of record key. In that case, the second type of record key may include a key used to identify the record, which is made part of the record In another aspect, a system may be provided for identifying records in a database system. The system may include a means for generating a first mapping. The first mapping may be used to identify a record in a database by reference to a first type of database key. The first type of database key may have a corresponding record in the database and may be a unique value based on information independent of both the content and organization of a record in a database.

Implementations may include one or more of the following features. The system may include a means for generating a second mapping. The second mapping may be used to identify records in the database by reference to a second type of database key. The second type of database key may correspond to a record in the database and the second type of database key may be a unique value. The system may include a means for removing the first type of database key from the record identified by the first mapping before storing the record in the database. In that case, the record identified by the first mapping may include the first type of database key when the record may be stored in memory at runtime.

Implementations of the systems and techniques described here may occur in hardware, firmware, software or a combination of these, and may include instructions for causing a machine to perform the operations described.

The database system described here may provide one or more of the following advantages. Programs may uniquely identify records in a database, including records without record information. Further, records may be uniquely identified before they are stored in a database, even records without record information. Also, multiple records may be uniquely identified by a program, even after the records are modified. Further, multiple records without record information may be stored in the database. Database systems may access records, in parallel, using an association system that allows for multiple records to be accessed without record information, and using an alternative system of accessing records that is dependent on record information. The database system may generate associations between a unique identifier and a record. The associations need not be stored on a storage device, thus the associations may be transient. Also, the associations may be advantageously updated in response to modifications of a record, such that a record is properly tracked. A program layer may be provided that may assist in the unique identification of records by a program. Database systems may be adapted to include an association system that may allow for the access of multiple records without record information. Such a database system may be adapted to operate using only an association system that allows for the access of multiple records without record information.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference numerals and designations in the drawings indicate like elements.

DETAILED DESCRIPTION

The systems and techniques described here relate to the design of a database system.

Figure 1:
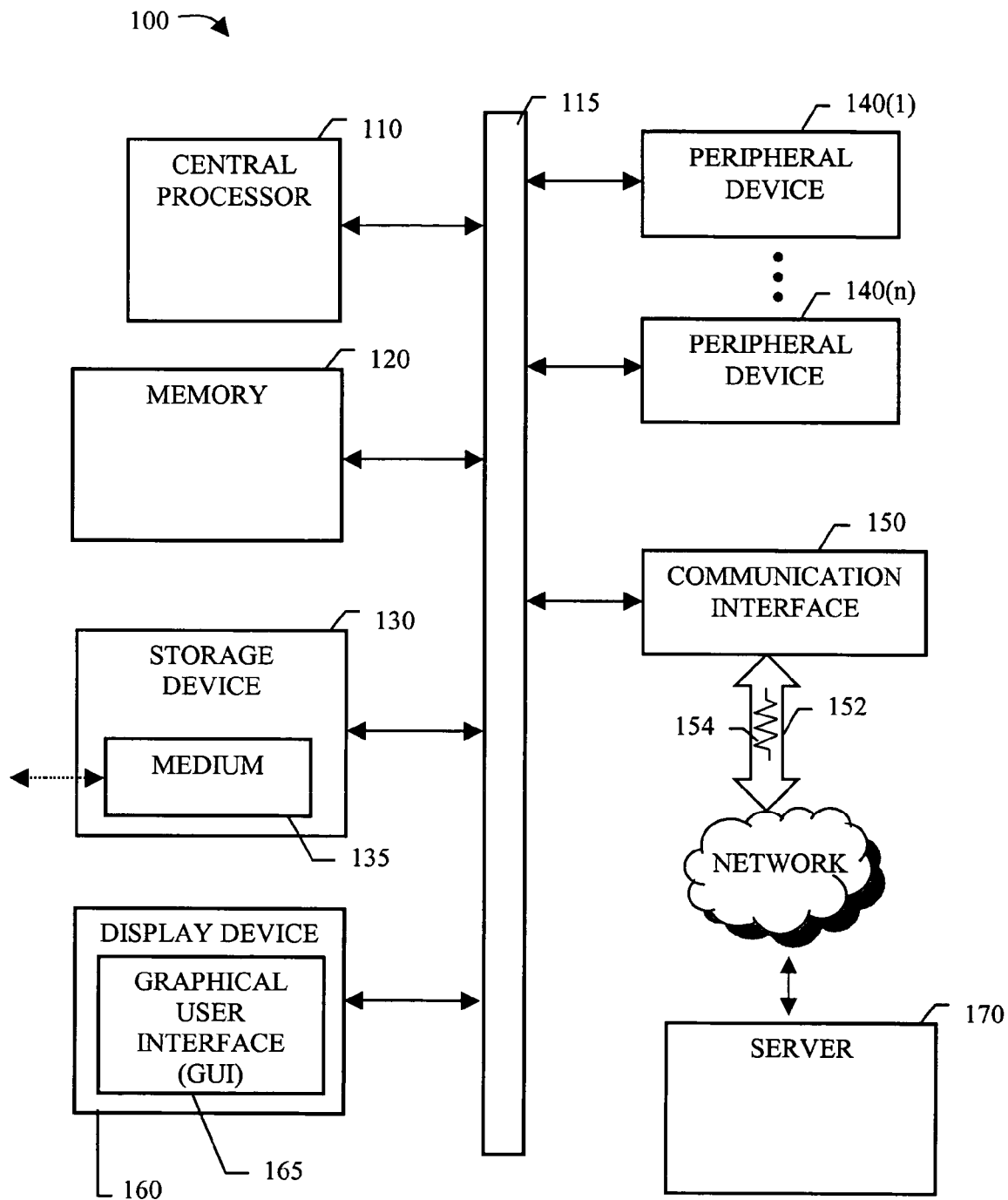
FIG. 1 is a block diagram of a computing system that may employ a database system.

FIG. 1 is a block diagram of an example computing system 100 that may employ a database system which has records uniquely associated with a program. The computing system 100 includes a central processor 110, which executes programs, performs data manipulations, and controls tasks in the computing system 100. The central processor 110 is coupled with a communications bus 115 that may include multiple busses, which may be parallel and/or serial busses.

The computing system 100 includes a memory 120, which may be volatile and/or non-volatile memory, and is coupled with the communications bus 115. The computing system 100 may also include one or more cache memories. The computing system 100 may include a storage device 130 for accessing a medium 135, which may be removable, read-only or read/write media and may be magnetic-based, optical-based, semiconductor-based media, or a combination of these. The computing system 100 may also include one or more peripheral devices 140(l)-140(n) (collectively, devices 140), and one or more controllers and/or adapters for providing interface functions, such as providing a mouse interface.

The computing system 100 may also include a display device 160 for displaying images and/or text from communications bus 115 to a user. The display device may be an LCD (liquid crystal display), CRT (cathode ray tube), or other device for displaying information to a user. The display device may display a graphical user interface 165, which is used to interact with the computing system 100 via one of the devices 140, such as a mouse or keyboard.

The computing system 100 may further include a communication interface 150, which allows software and data to be transferred, in the form of signals 154 over a channel 152, between the computing system 100 and external devices, networks, or information sources. The signals 154 may embody instructions for causing the computing system 100 to perform operations. The computing system 100 represents a programmable machine, and may include various devices such as embedded controllers, Programmable Logic Devices (PLDs), Application Specific Integrated Circuits (ASICs), and the like. Machine instructions (also known as programs, software, software applications, or code) may be stored in the computing system 100 and/or delivered to the computing system 100 over a communication interface. These instructions, when executed, enable the computing system 100 to perform the features and function described herein. These instructions represent controllers of the computing system 100 and may be implemented in a high-level procedural and/or object-oriented programming language, and/or in assembly/machine language. Such languages may be compiled and/or interpreted languages.

The computing system can include clients and servers. A client and server are generally remote from each other and typically interact through a communication network. The relationship of client and server arises by virtue of computer programs running on the respective computing systems and having a client-server relationship to each other. A server 170 may be accessible via the communication interface 150.

The computing system may also have one or more databases (not shown). A database is a collection of records that store information. The database may be stored on medium 135, or stored on a medium (not shown) that is coupled with server 170 and is accessible via the communication interface 150. A program executing in the computing system 100 may access records in the one or more databases. Access may include generating, reading, opening, copying, modifying, saving, or other operations that access a record. Records may be adapted such that a database key, which is a key that may be used to identify a record, may be kept in the record. However, the database key may be removed from a record before saving a record to the database.

Figure 2:
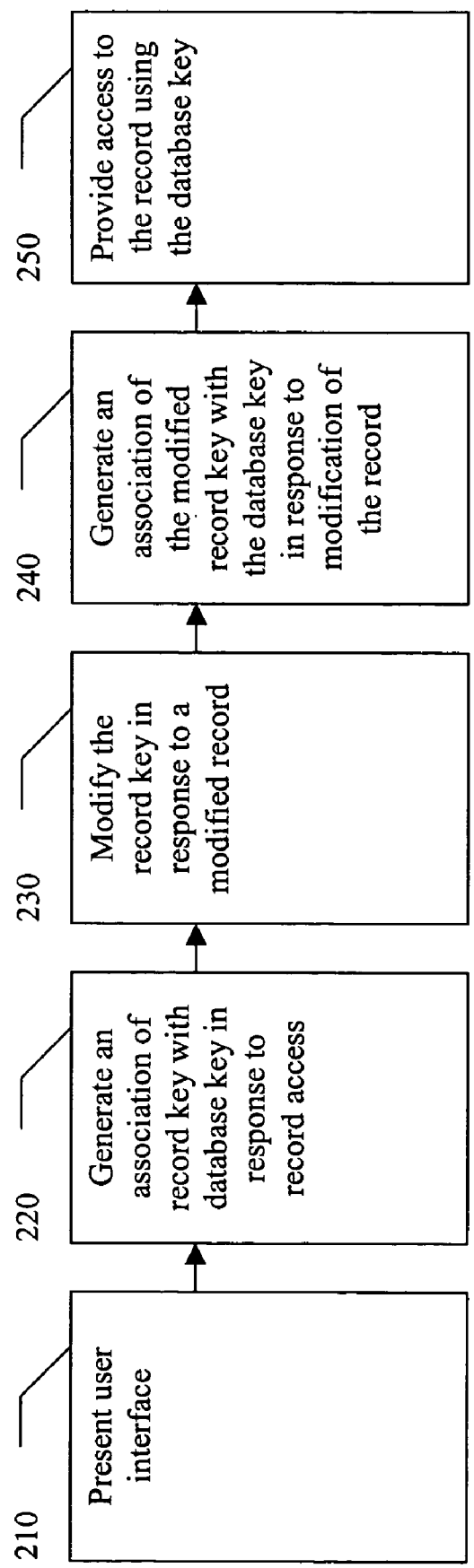
FIG. 2 is a flowchart illustrating association of database records with a program.

FIG. 2 is a flowchart illustrating association of database records with a program. A user interface is presented to a user at 210. The user interface may allow a user to access records in a database. The user interface may be a graphical user interface, which may use a combination of graphical structures to display records in the database. The graphical structures may be windowpanes, tables, spreadsheets, or other graphical structures. A graphical user interface may accept input from an input device, such as a mouse or keyboard, to allow a user to interact with the user interface. Alternatively, the user interface may be a command-line user interface, such that commands are provided to the user interface via an input device, or any other type of user interface. Using the input device coupled with the user interface, a user may be able to access records. Access may include generating a record. For example, a user may generate a record by using a mouse to click on a "new record" button. Access may also include reading a record. For example, a user may cause a user interface to read a record from the database by using a mouse to click on an "open record" button, which may read the record from the database and display portions of the record in the user interface. Access may also include saving a record. For example, a user may save a record by using a mouse to click on a "save record" button. And, access may include modifying a record. Modifying a record in the database may occur when a user changes information in a record, such as an attribute, or changes information related to the record, such as the date the record was last accessed.

A record key association with a database key may be generated in response to a record access at 220. Generation of an association may include creating an association, updating an already existing association, or otherwise making the mechanism that manages associations reflect the record access. Access may include generating, reading, opening, copying, modifying, saving, or other operations that access a record. A record key may include information from the record itself, and may be used to identify the record. For example, in a database of employee information, the record key may be the home address of the employee, which can be used to identify the record. For example, the record key in a database of employee information may include the home address of the employee, such as "123 Maple Street." Also, the record key may include information related to the organization of the record. For example, a record key may include a record identifier portion, such as the home address of an employee, and a database identifier portion, such as a string indicating the name of the database related to the record. A database key may include many types of information and may be based on information independent of both the content and organization of any record in any database. For example, the database key may be an 80 digit integer value created sequentially for each record accessed, such as "000 . . . [74 zeros] . . . 002". Also, the database key may be associated with the record key by using any of a number of mechanisms of tracking the record. For example, a mapping table may be generated which associates database keys with records using the record key. To uniquely identify a record, the record key may be uniquely associated with the database key by using multiple types of information related to the record. For example, if multiple employees live at the same address, a combination of the home address and a number may be used to associate the record key, i.e. the home address, with the database key.

A record key may be modified in response to the modification of a record at 230. Modification of the record key may include adding new information to the record key, removing old information from the record key, or replacing information, in whole or in part, in the record key. For example, in a database of employee information, if the record key is the home address of an employee, such as 123 Maple Street, the address may be changed to another value, such as 456 Pine Street, which may modify the corresponding record key.

A modified record key may be associated with the database key in response to a record access, such that the database key can properly track the record, at 240. Following the prior example, if the record key is associated with the database key by a table of database keys and record keys, the record key association in the table may be updated to reflect the change of the record key from 123 Maple Street to 456 Pine Street in response to the modification of the record.

The user interface can be used to access a record at 250. Access may be provided by a program using the database key. Thus, the record, including any changes to it, may now be accessible for many types of operations. For example, if a user desires to print out a record, which includes an updated home address of an employee, the user may access that record in the database.

Figure 3:
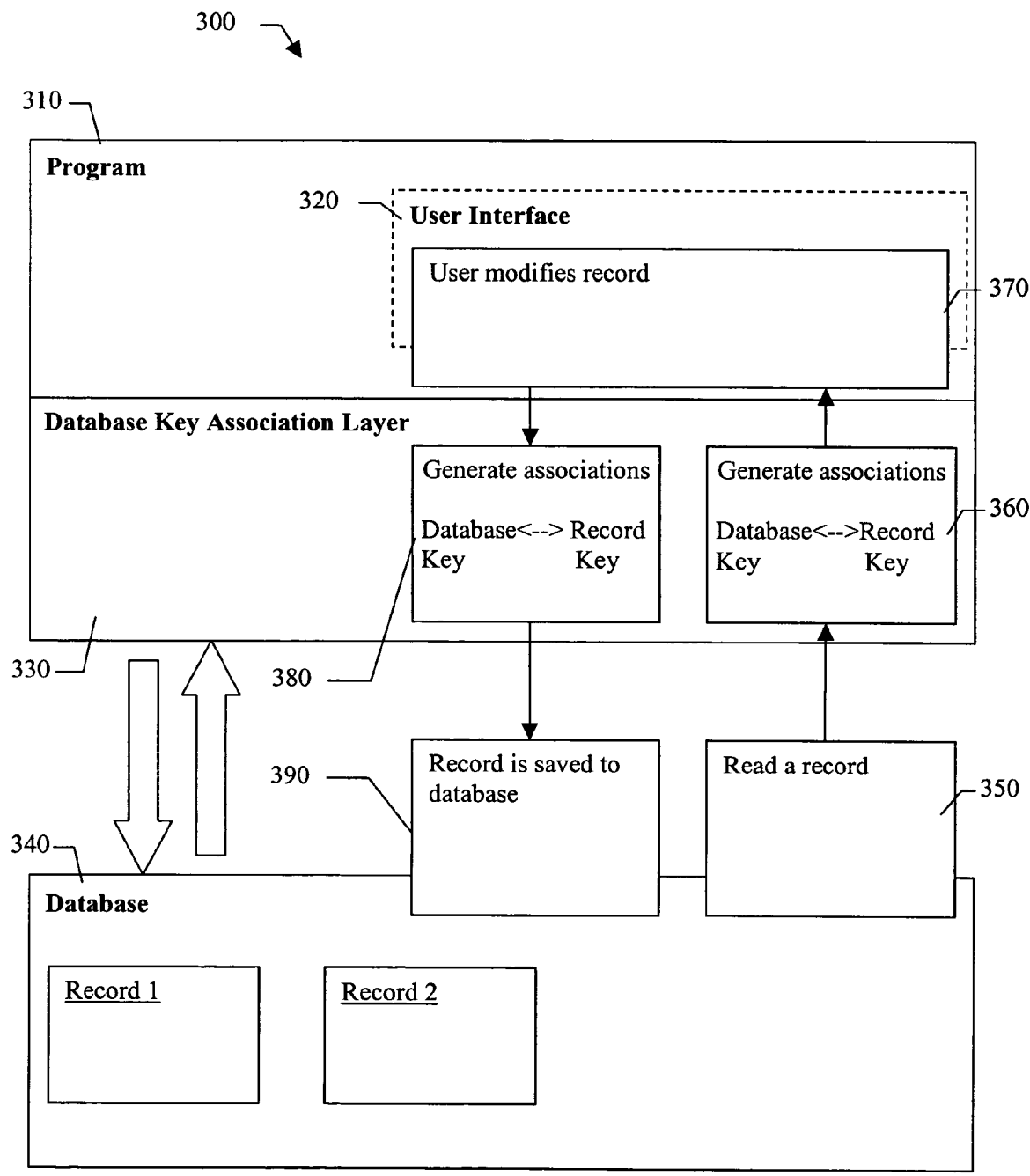
FIG. 3 is a block diagram illustrating association of database records with a program.

FIG. 3 is a block diagram illustrating association of database records with a program in a database system 300. The database system 300 includes a program 310. The program 310 may be any program that uses the database. For example, the program may be a spreadsheet application program which accesses the database and displays records from the database in the user interface 320. The user interface 320 may be used to access records, including generating, reading, opening, transferring, modifying, saving, or other operations that access a record. The database program 310 may include a database key association layer 330 for generating associations of database keys with record keys. The database key association layer may also handle all access of database records. The database key association layer 330 may use a table or other mechanism to associate database keys with record keys. Each database key may be based on information independent of both the content and organization of any record in any database. The database key association layer 330 may be a separate program or may be part of the program itself. The database system 300 may also include a database 340 which may include records. For example, the database system may include a "Record 1" and a "Record 2." Although in FIG. 3, the program 310 and database 340 are shown separately, the program may include the database 340.

Optionally, a record may be read from the database at 350. Alternatively, a record may be made available to the program by other mechanisms and/or processes. For example, the program 310 may generate the record, or the program 310 may receive the record over a communication interface.

An association may be generated between a database key and a record key in response to an access of the record at 360. For example, the database key association layer 330 may generate a table association between the database key and the corresponding record key.

A user may modify a record, thereby modifying the record key, at 370. The modification of the record may result in modification of the entire record key or only of a portion of the record key. For example, in a database of employee information, where a record key includes an employee's last name, the record key may be SMITH. If the employee record were changed, such that the last name changed, the new record key might be JONES.

In another example, two databases may exist, such that there is a first database and a second database, and both databases include employee information. The first database may have records of all employees and the second database may have records of employees that have won an "employee of the month" contest. Both databases might use a record key that is based on an employee identification number (employee ID), such that each employee record in the second database may have the same record key, the employee ID, as the corresponding employee record in the first database, i.e. an employee ID "12345" may normally have a record key "12345." To differentiate between records in the two databases, the record key may have a record identifier portion and an object type portion. The object identifier portion may be the employee ID and the object type portion may be an acronym to indicate the database related to the record, such as AE for records related to the all employees database and EM for records related to the employee of the month database. Thus, a record key for a record related to the all employees database might be "12345AE," and the record key for a corresponding record related to the employee of the month database might be "12345EM". If employee ID information were to change, such that employee records in both databases were updated with a new employee ID being "1234500", the corresponding record key for the first database may change, from "12345AE" to "1234500AE." Also, the corresponding record key for the record related to the second database may change from "12345EM" to "1234500EM". Alternatively the object type need not be part of the record key. For example, the record key may include an object identifier, such as 12345, and the object type may be used by the database key association layer to uniquely associate the database key with the record.

An association of a database key with a record key may be generated in response to record access, at 380. Following a previous example, if the database key association layer uses table associations, a table entry SMITH might be changed to JONES. More complex record keys may be used to uniquely associate the database key with the record. In an example based on the employee ID example, a table may be used to associate a record key with a database key. The record key may include an object identifier portion and an object type portion. The object identifier may be the employee ID 12345. The object type portion may include an acronym that indicates the database related to the record, and a value that may indicate whether the record is an original or a copy, such as a string "original" and a string "copy 1". Thus, if the records identified by 12345 were originals, they might have record keys "12345AE Original" and "12345EM Original". If copies were made of the two records, a total of four records may exist (two originals and two copies), which may be identified by the record keys "12345AE Original", "12345EM Original", "12345AE Copy 1", and "12345EM Copy1." If the database keys associated with the record keys are 001, 002, 003, and 004, respectively, table entries for the four records may be 001, 12345AE Original; 002, 12345EM Original; 003, 12345AE Copy1; and, 004, 12345EM Copy1. Alternative implementations may define the record key, object identifier, and object type differently such that a database key is uniquely associated with a record. For example, the record key may include the object identifier, such as 12345, and the object type may be used by the database association layer to uniquely associate database keys with records, such that table entries may be 001, 12345, AE Original; 002, 12345, EM Original; 003, 12345, AE Copy1; and, 004, 12345, EM Copy1.

Optionally, the record may be saved to the database at 390. The save may reflect changes to the record. The database key need not be stored with the record, such that the database key association layer may remove a database key from the record before the record is stored in a database.

Alternative implementations of the systems and techniques disclosed are also possible. The systems and techniques illustrated in FIGS. 2, 3 may co-exist with other approaches to accessing database records. For example, a database system may have two approaches to accessing records. A first approach may access records with a record key that is unique, and a second approach may access records with a non-unique record key and database key in accordance with the systems and techniques described. When a record is generated, and the information to generate the unique record key is not yet available, the record may be accessed by the non-unique record key in accordance with the second approach. When the unique record key is available, records may be accessed by the unique record key, in accordance with the first approach. Alternatively, any combination of approaches to accessing databases may be employed. Also, the unique record key may be stored in the database.

A database system that implements other approaches to access database keys may be modified to additionally access database keys in accordance with the systems and techniques described. For example, a database that uses a first approach with a record key that is unique, may be modified to additionally access records by a second approach that uses a record key in accordance with the systems and techniques illustrated. Modifications to the database system may require additional memory resources, new data structures, new file types for storing the database, and/or additional programs to access records using both approaches in parallel. Such a database system may advantageously be able to access the records without unique record information. When unique record information becomes available to a record, the first approach, which uses a record key based on unique record information, may be used to access the record. Alternatively, the database may continue to access records using the second approach to accessing records.

Although a few embodiments have been described in detail above, other modifications are possible. Other embodiments may be within the scope of the following claims. For example, the operations described can be performed in a different order, or using different sub-processes, and still achieve desirable results.

What is claimed is:

1. A computer implemented method comprising:
accessing records in a database including identifying records using database keys corresponding to each record, wherein each record in the database has a database key that uniquely identifies the corresponding record in the database;
generating records outside the database in response to a user input and through a user interface, wherein generating records includes generating records having non-unique record keys and no database keys;
generating database keys for records having no database key using a database key association layer;
associating the generated database keys with non-unique record keys, where non-unique record keys do not have sufficient information to uniquely identify records in the database;
receiving, in the database key association layer, a first non-unique record key from the user interface for a first record, the first non-unique record key having insufficient information to uniquely identify the first record as a record in the database;
generating a first database key for the first record and uniquely associating the first database key with the first non-unique record key to enable the first record to be stored in the database, the generating a first database key for the first record and uniquely associating the first database key with the first non-unique record key being done by the database key association layer; and
storing the first record in the database after the first database key has been generated, the database using the first database key to identify the first record in the database.

2. The method of claim 1, wherein the first database key is a unique value based on information independent of both the content and organization of the first record in the database.

3. The method of claim 1, wherein the first record includes the first database key when stored in memory at runtime, the method further comprising removing the database key from the record before storing the record in the database.

4. The method of claim 1, wherein the first non-unique record key comprises an object identifier portion and an object type portion.

5. A database system comprising:
a database comprising records, wherein each record in the database has a database key that uniquely identifies the corresponding record in the database;
a program executing in the computing system that accesses records in the database, the program identifying records using the database keys corresponding to each record;
a user interface operable to allow a user to generate records outside the database, including records having non-unique record keys and no database keys;
a database key association layer operable to generate database keys and associate database keys generated by the database key association layer with non-unique record keys, where non-unique record keys do not have sufficient information to uniquely identify records in the database;
wherein the database key association layer is operable to receive a first non-unique record key from the user interface for a first record, the first non-unique record key having insufficient information to uniquely identify the first record as a record in the database, and to generate a first database key for the first record and uniquely associate the first database key with the first non-unique record key to enable the first record to be stored in the database; and wherein the database key association layer is further operable to store the first record in the database after having generated the first database key, the database using the first database key to identify the first record in the database.

6. The database system of claim 5, wherein the first record includes the first database key when stored in memory at runtime and the first record does not include the first database key when stored in the database.

7. The database system of claim 5, wherein the first database key is a unique value based upon information independent of both the content and organization of a record in a database.

8. The database system of claim 7, wherein the database key association layer is operable to generate a second database key usable to identify the first record in the database, wherein the second database key is based upon the record content and organization of the first record in a database.

9. An article comprising a machine-readable medium storing instructions operable to cause one or more machines to perform operations comprising:

accessing records in a database including identifying records using database keys corresponding to each record, wherein each record in the database has a database key that uniquely identifies the corresponding record in the database;

generating records outside the database in response to a user input and through a user interface, wherein generating records includes generating records having non-unique record keys and no database keys;

generating database keys for records having no database key using a database key association layer;

associating the generated database keys with non-unique record keys, where non-unique record keys do not have sufficient information to uniquely identify records in the database;

receiving, in the database key association layer, a first non-unique record key from the user interface for a first record, the first non-unique record key having insufficient information to uniquely identify the first record as a record in the database;

generating a first database key for the first record and uniquely associating the first database key with the first non-unique record key to enable the first record to be stored in the database, the generating a first database key for the first record and uniquely associating the first database key with the first non-unique record key being done by the database key association layer; and storing the first record in the database after the first database key has been generated, the database using the first database key to identify the first record in the database.

10. The article of claim 9, wherein the first database key is a unique value based on information independent of both content and organization of the first record in the database.

11. The article of claim 9, wherein the first non-unique record key comprises an object identifier portion and an object type portion.

* * * * *